US012777990B2

(12) United States Patent
Hanson et al.

(10) Patent No.: US 12,777,990 B2
(45) Date of Patent: Nov. 3, 2026

(54) SYSTEM AND METHOD FOR AUTOMATIC DETECTION OF PIVOT TRACKS AND BOARDERS

(71) Applicant: CNH Industrial America LLC, New Holland, PA (US)

(72) Inventors: Kevin Hanson, New Holland, PA (US); Jon McKinnis, Jr., New Holland, PA (US); Jeffrey Fay, II, New Holland, PA (US); Kevin Cordes, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 271 days.

(21) Appl. No.: 18/307,132

(22) Filed: Apr. 26, 2023

(65) Prior Publication Data

US 2024/0357951 A1 Oct. 31, 2024

(51) Int. Cl.
*A01B 69/04* (2006.01)
*A01B 79/00* (2006.01)
*G06Q 50/02* (2024.01)

(52) U.S. Cl.
CPC .......... *A01B 69/008* (2013.01); *A01B 79/005* (2013.01); *G06Q 50/02* (2013.01)

(58) Field of Classification Search
CPC ................ A01D 34/006; A01D 41/127; A01D 41/1278; A01D 41/141; A01D 75/28; E02F 3/434; E02F 9/205; E02F 9/2045; E02F 9/261; G05D 1/0212; G05D 1/0214; G05D 1/0219; G05D 1/0274; G05D 1/0278; G05D 2105/15; B60W 10/20; B60W 2300/152; G06Q 50/02; G06V 20/188
See application file for complete search history.

(56) References Cited

U.S. PATENT DOCUMENTS

| | | | | |
|---|---|---|---|---|
| 4,622,806 | A | 11/1986 | Bahnman et al. | |
| 6,714,662 | B1 * | 3/2004 | Benson | G06T 7/70 701/28 |
| 10,467,351 | B2 | 11/2019 | Christensen et al. | |
| 2007/0068129 | A1 * | 3/2007 | Strosser | A01D 41/141 56/10.2 E |
| 2008/0103694 | A1 * | 5/2008 | Dix | A01B 69/008 701/425 |

(Continued)

*Primary Examiner* — Fadey S. Jabr
*Assistant Examiner* — Mario C Gonzalez
(74) *Attorney, Agent, or Firm* — Foley & Lardner LLP

(57) ABSTRACT

A system and method for automatically detecting pivot tracks and borders is disclosed. The system includes an agricultural vehicle, a sensor coupled to the agricultural vehicle, and a vehicle control system. The sensor is configured to detect a change in position. The vehicle control system includes a processing circuit. The processing circuit includes a processor and a memory. The memory has instructions stored thereon that, when executed by the processor, cause the processing circuit to receive sensor information for the agricultural vehicle from the sensor, receive an indication to mark a geographic position based on the sensor information, mark a plurality of geographic positions associated with a pivot track or a border, and determine a complete location of the pivot track or the border based on the plurality of marked geographic positions associated with the pivot track or the border.

20 Claims, 9 Drawing Sheets

(56) References Cited

U.S. PATENT DOCUMENTS

| | | | | |
|---|---|---|---|---|
| 2012/0296529 | A1* | 11/2012 | Peake | G05D 1/0274 701/50 |
| 2014/0024313 | A1 | 1/2014 | Campbell | |
| 2018/0022402 | A1* | 1/2018 | Hamilton | B62D 33/0604 296/190.07 |
| 2021/0341944 | A1* | 11/2021 | Schoon | G06F 16/1744 |
| 2022/0201936 | A1* | 6/2022 | Hamilton | A01D 43/107 |
| 2023/0309449 | A1* | 10/2023 | Vandike | G05D 1/0044 701/50 |
| 2023/0323612 | A1* | 10/2023 | Keyes | G05D 1/0214 |
| 2024/0016088 | A1* | 1/2024 | Nishii | A01D 41/1278 |
| 2024/0040978 | A1* | 2/2024 | Garwood | A01G 25/162 |
| 2025/0081873 | A1* | 3/2025 | Nilsson | A01B 69/008 |

* cited by examiner

SYSTEM AND METHOD FOR AUTOMATIC DETECTION OF PIVOT TRACKS AND BOARDERS

BACKGROUND

The present disclosure relates generally to autoguidance systems for agricultural vehicles. More specifically, the present disclosure relates to automatically detecting and updating the guidance controls for a vehicle based on the presence of pivot tracks and field borders.

SUMMARY

One embodiment relates to a system for automatically detecting pivot tracks and borders. The system includes an agricultural vehicle, a sensor coupled to the agricultural vehicle, and a vehicle control system. The sensor is configured to detect a change in position. The vehicle control system includes one or more processing circuits, each processing circuit including a processor and a memory. The memory has instructions stored thereon that, when executed by the processor, cause the processing circuit to receive sensor information for the agricultural vehicle from the sensor, receive an indication to mark a geographic position based on the sensor information, mark a plurality of geographic positions associated with a pivot track or a border, and determine a complete location of the pivot track or the border based on the plurality of marked geographic positions associated with the pivot track or the border.

In some embodiments, the processing circuit also populates an autoguidance system of the agricultural vehicle with the complete location of the pivot track or the border. In further embodiments, populating the autoguidance system of the agricultural vehicle includes displaying an image of the pivot track or the border on a GPS unit.

In other embodiments, the system for automatically detecting pivot tracks and borders also includes a header coupled to the agricultural vehicle. Further, the sensor is coupled to the header and is configured to detect the change in position as the header travels over the pivot track or the border.

In other embodiments, the system for automatically detecting pivot tracks and borders includes a hydraulic cylinder coupled to the agricultural vehicle. Further, the sensor is coupled to the hydraulic cylinder and is configured to detect the change in position as the hydraulic cylinder travels over the pivot track or the border.

In additional embodiments, the processing circuit also receives an indication of a period bounded by a start time and an end time. In some aspects, the processor only marks the plurality of geographic positions associated with the pivot track or the border during the period bounded by the start time and the end time.

Another embodiment relates to a system for automatically detecting pivot tracks and borders that includes an agricultural vehicle, a sensor, and a vehicle control system. The sensor is coupled to an irrigation system. The sensor is also configured to collect data indicating a geographic position. The vehicle control system includes one or more processing circuits. Each processing circuit includes a processor and a memory. The memory has instructions stored thereon that, when executed by the processor, cause the processing circuit to: receive sensor information for the agricultural vehicle from the sensor, and determine a complete location of a pivot track from the sensor information.

In other embodiments, the sensor is a GPS receiver communicatively coupled to the agricultural vehicle.

In further embodiments, the system includes a plurality of sensors coupled to the irrigation system. Each of the plurality of sensors is coupled to a pivot tower of the irrigation system and is configured to collect data indicating a geographic position. The processing circuit receives sensor information for the agricultural vehicle from each of the plurality of sensors and determines a complete location of a pivot track associated with each of the plurality of sensors.

In other embodiments, each of the plurality of sensors is a GPS receiver communicatively coupled to the agricultural vehicle.

In some embodiments, the processing circuit populates an autoguidance system of the agricultural vehicle with the complete location of the pivot track.

In further embodiments, the processing circuit populates an autoguidance system of the agricultural vehicle with the complete location of each pivot track associated with each of the plurality of sensors.

In another embodiment, a method for automatically detecting pivot tracks and borders is disclosed. The method includes the steps of receiving sensor information for an agricultural vehicle from one or more sensors, receiving an indication to mark a geographic position based on the sensor information, marking a plurality of geographic positions, each of the plurality of marked geographic positions associated with a pivot track or a border, and determining a complete location across an agricultural zone of the pivot track or the border based on the plurality of marked geographic positions associated with the pivot track or the border.

In other embodiments, at least one sensor involved in the method is coupled to a header or a hydraulic cylinder of the agricultural vehicle.

In some embodiments, at least one sensor involved in the method is coupled to a pivot tower of an irrigation system.

In additional embodiments, the method also includes the step of populating an autoguidance system of the agricultural vehicle with the complete location of the pivot track or the border.

In other embodiments, the method includes the step of determining a pathway for the agricultural vehicle based on the complete location across the agricultural zone of the pivot track or the border, the pathway resulting in a uniform spacing of swaths.

In further embodiments, the step of marking the plurality of geographic positions occurs only during a period bounded by a start time and an end time. In particular embodiments, the start time corresponds to a beginning of a process of cutting headlands. In some embodiments, the end time corresponds to a conclusion of a process of cutting headlands.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 4 is a schematic block diagram of a

DETAILED DESCRIPTION

Figure 1:
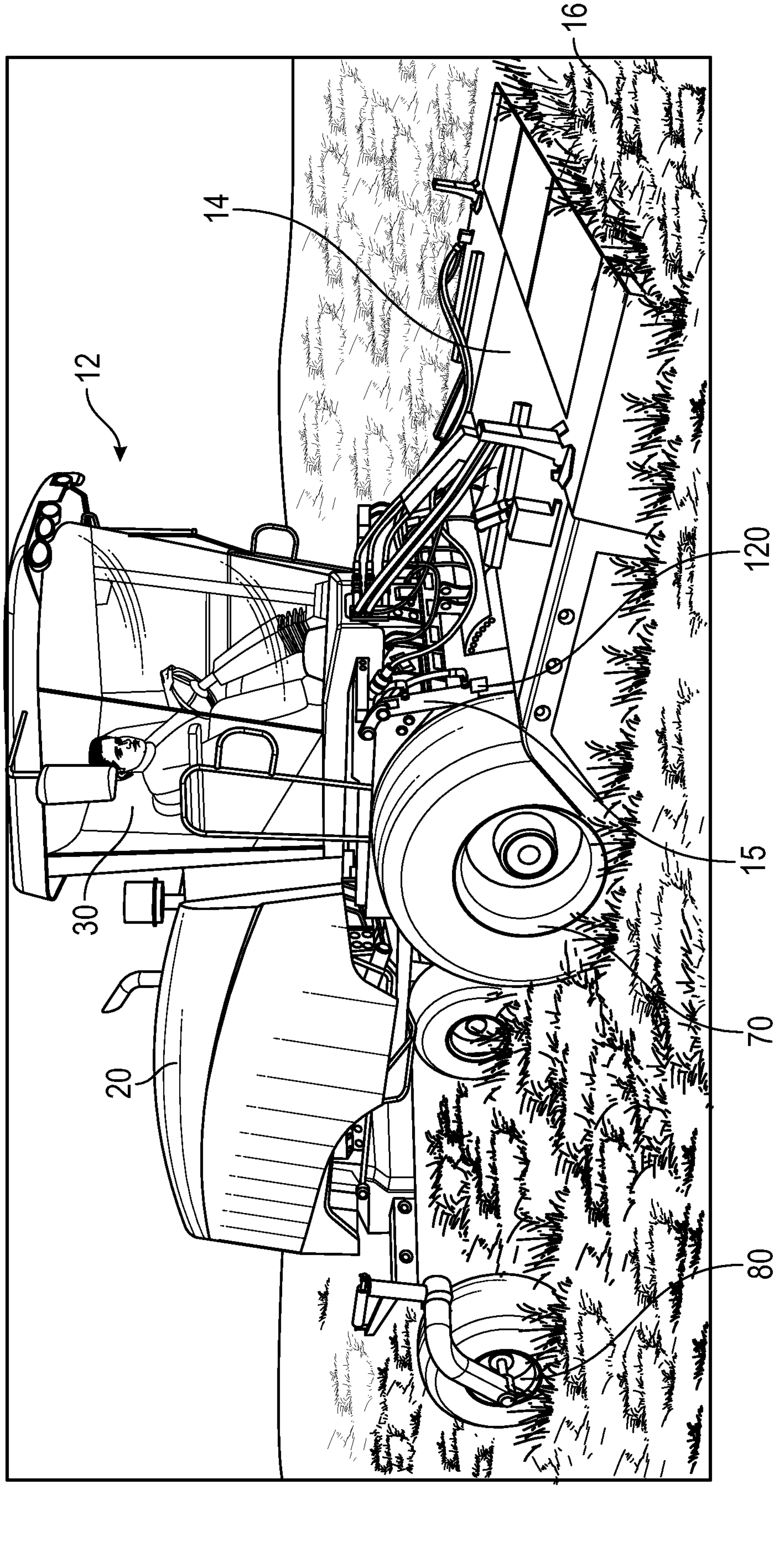
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Industrial vehicles such as agricultural vehicles 10 (e.g., windrowers, swathers, tractors, tillers, planters, sprayers, combines, and fertilizers, etc.) may be utilized in agricultural applications to facilitate the growing of crops and any other type of agricultural application. Typically, agricultural vehicles 10 may include one or more vehicle control systems which are configured to control the operation of the vehicle to provide auto-guidance for the vehicle. An auto-guidance control system may be described as an automated method for controlling one or more vehicles with a high level of accuracy. The auto-guidance control system may allow the vehicle to steer, turn, and generally operate with at least some level of autonomy with a high level of positioning accuracy. While in use, agricultural vehicles 10 may encounter varying field conditions, boundaries, and obstacles that require a change in the vehicle's path or alter the optimal harvest path in a particular agricultural zone. For example, in the context of mowing, swathing, or baling hay planted in a field utilizing a central pivot irrigation system, pivot tracks (made by the pivot tower when it rotates around the field) designate areas where no crop growth occurs and shape the optimal path that a swather/windrower should travel when navigating the field. In rectangular fields or fields utilizing linear irrigation systems, borders serve as another field condition that must be accounted for in an autoguidance system of the agricultural vehicle 10. Accounting for field conditions and obstacles allows for pathing with optimal overlap so that all passes are at uniform spacing. Automatically adjusting an autoguidance system to account for pivot tracks and borders creates more uniformly sized and spaced swaths, increases efficiency by reducing operator time spent steering, and eliminates the need for operators to manually trace pivot tracks and borders into the auto-guidance system.

In some embodiments, an agricultural vehicle (e.g., a windrower) may include a vehicle control system which may be configured to automatically detect pivot tracks and borders and indicate their locations to the autonomous guidance system of the agricultural vehicle. The vehicle control system is communicatively coupled to position sensors disposed on the header of a vehicle (e.g., on the hydraulic cylinders of the header). The position sensors detect a change in placement of the header as it floats over a pivot track or border, and send the data indicating a change in placement to the auto-guidance controller. The vehicle control system then tracks the location of the displacement via a GPS marker. Once the agricultural machine has passed over multiple pivot tracks or borders (e.g., when cutting headlands around the pivot towers or a field), the vehicle control system may automatically draw circular indicators for pivot tracks (for central pivot systems) or linear indicators for borders (for rectangular fields) on the GPS system of the agricultural vehicle. The indicators are then accounted for automatically by the agricultural machine's autoguidance system. In further embodiments, sensors (e.g., GPS markers) are coupled to pivot towers above the pivot tracks of an irrigation system. GPS pathways of the pivot tracks are marked as the irrigation system moves, and indicators of the pivot track are communicated to the vehicle control system. The agricultural machine then immediately enters an autoguidance mode factoring in the location of the pivot towers upon entering the field.

Systems and methods directed to automatically detecting pivot tracks and borders in agricultural vehicle autoguidance systems are described in the present application. More specifically, an vehicle control system for controlling agricultural vehicles is described that incorporates sensors mounted to the header, hydraulic cylinders, or other components of the agricultural vehicle. Additionally, sensors may be mounted in locations on a pivot tower of an irrigation system to indicate the location of pivot tracks. The vehicle control system receives information about the change in position of the header as it floats over a pivot track or border and uses the information to dynamically map full pathways of pivot tracks and borders. The mapping is used to automatically calibrate and adjust the autoguidance system of the agricultural vehicle. For example, the vehicle control system disclosed herein may include a variety of sensors and a marking circuit which is configured to receive information from the variety of sensors. The marking circuit may be configured to mark locations of pivot tracks and borders by receiving indications of the displacement of the headers/hydraulic cylinders of the vehicle. Additionally, an auto-guidance controller circuit may receive information from sensors coupled to pivot towers indicating the location of pivot tracks. The auto-guidance controller circuit may then use that information to adjust the agricultural vehicles autoguidance system, create an optimized pathway immediately upon entering a field, and allow for uniform swath spacing and optimized path overlap with minimum interaction from the operator.

For the purposes of the present disclosure, the term "vehicle" refers to any equipment that can be moved (e.g., within a field), regardless of whether the equipment includes a prime mover or other device configured to move the equipment under its own power. For example, the term "vehicle" applies to powered equipment such as a windrower, swather, tractor, combine, harvester, etc., but the term "vehicle" also applies to equipment that moves through the assistance of another vehicle, such as various agricultural or construction implements that are attached/coupled to another vehicle (e.g., implements such as irrigation machinery, soil cultivation implements, planting equipment, harvesting implements, etc. that are attached to and moved by a tractor or other vehicle). Though agricultural vehicles are primarily described in the present disclosure, the systems and methods herein may be applied in a variety of industrial applications including construction.

Overall Vehicle

Figure 2:
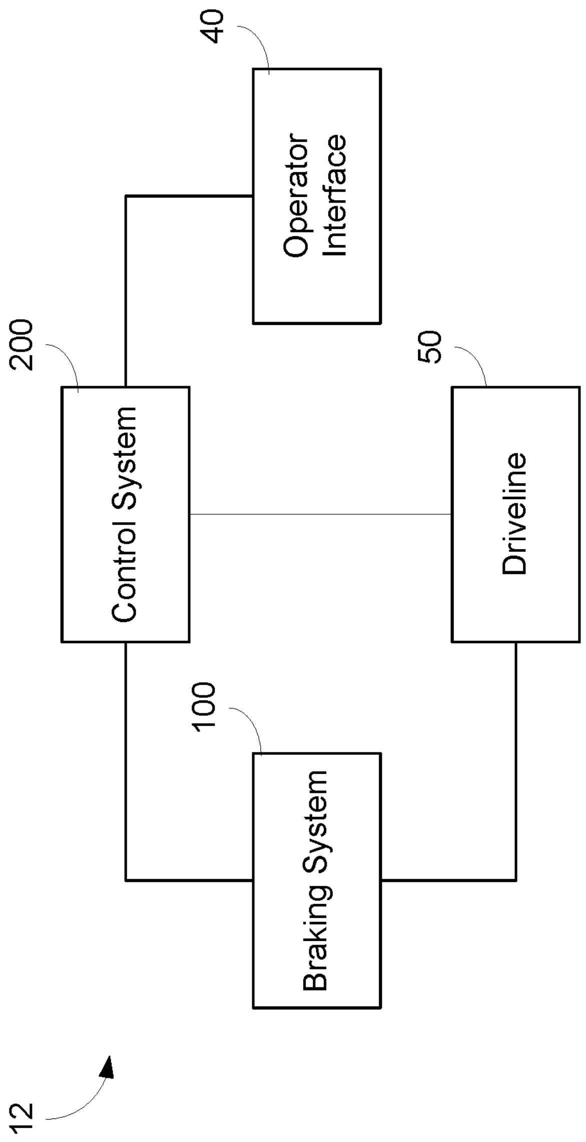
FIG. 2 is a schematic block diagram of the vehicle of FIG. 1, according to an exemplary embodiment

According to the exemplary embodiment shown in FIG. 1, a machine or vehicle, shown as windrower 12, includes a body assembly, shown as body 20, coupled to a vehicle frame and having an occupant portion or section, shown as cab 30. The cab 30 may include one or more operator input and output devices that are disposed within the cab 30. The operator input and output devices may include a steering wheel, a gear shift, and/or a display screen. The windrower 12 may be propelled by a drivetrain 50, which is described in more detail with respect to FIG. 3. In some embodiments, as shown in FIG. 2, the windrower 12 may also include a vehicle braking system 100, coupled to one or more components of the driveline 50 to facilitate selectively braking the one or more components of the driveline 50. The windrower 12 also includes a vehicle control system, shown as control system 200, coupled to the operator interface 40, the driveline 50, and the braking system 100. In other embodiments, the windrower 12 includes more or fewer components. In the exemplary embodiment shown in FIG. 1, the windrower 12 is an agricultural vehicle 10 with a header 14 (e.g., a disc header, draper header, sicklebar header, etc.) that is structured to cut and condition a crop within an agricultural area 16.

It should be understood that the windrower 12 shown in FIG. 1 is merely an exemplary agricultural vehicle 10, and the features of the present disclosure can be used with any type of vehicle (e.g., any type of industrial vehicle, such as an agricultural or construction vehicle) in various example embodiments. According to an exemplary embodiment, the windrower 12 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the windrower 12 may include one or more attached implements and/or trailed implements such as a combine, a sprayer, a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the windrower 12. In some embodiments, the cab 30 is configured to provide seating for one or more passengers of the windrower 12. According to an exemplary embodiment, the operator interface 40 is configured to provide an operator with the ability to control one or more functions of and/or provide commands to the windrower 12 and the components thereof (e.g., turn on, turn off, drive, turn, brake, engage various operating modes, raise/lower the header 14, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

Figure 3:
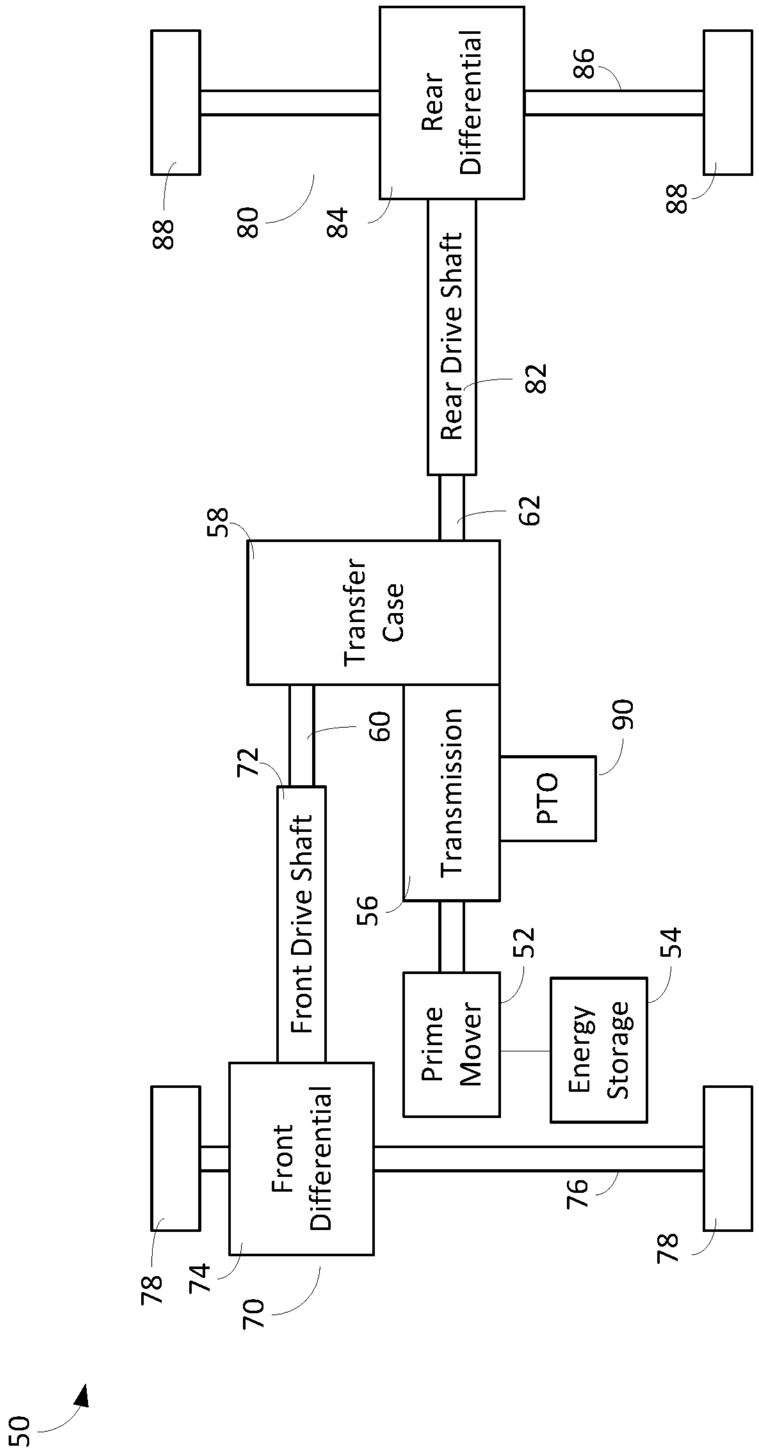
FIG. 3 is a schematic block diagram of the vehicle of FIG. 1, according to an exemplary embodiment.

According to an exemplary embodiment, the driveline 50 is configured to propel the windrower 12. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIG. 3, a front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIG. 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 are structured as tracks while the rear tractive elements 88 are structured as wheels. In other embodiments, the front tractive elements 78 and the rear tractive elements 88 are may be a variety or combination of the foregoing. In some embodiments, the front tractive elements 78 and the rear tractive elements 88 are both steerable. In other embodiments, only a subset of the front tractive elements 78 or the rear tractive elements 88 is steerable. In still other embodiments, both the front tractive elements 78 and the rear tractive elements 88 are fixed and not steerable. In such embodiments, additional tractive elements may be included to steer the windrower 12.

Like the drive and steering assembly of an agricultural vehicle 10, a windrower 12 according to exemplary embodiments, may include a variety of different drive and steering configurations. For example, as shown in FIG. 1, a windrower 12 may include a front tractive assembly 70 that includes wheels (e.g., front tractive elements 78) driven by a prime mover 52. In some embodiments, the wheels may be coupled to a front differential 74 and/or rear differential 84 such that the operator may independently vary the speed of the wheels on each side of the windrower 12. The windrower 12 may include a steering column coupled to a system of rotational pivots, differentials, hydraulic motors, hydraulic lines, etc. to angle, pivot, and/or direct the windrower 12 around sharp curves and bends. In some embodiments, rather than differential steering, the windrower 12 may include a system of articulated steering. In such an embodiment, the windrower 12 may be divided into two separate sections connected by a pivot joint. The cab, 30, prime mover 52, and steering column may be located on a front section while a mower or implement trailing the windrower 12 may be located on a rear section that may pivot independently of the front section to navigate sharp turns or corners. As shown in FIG. 1, in some embodiments, the windrower 12 may include a set of wheels (e.g., the rear tractive assembly 80) that are not driven by the prime mover 52. For example, a windrower 12 may include a rear castor assembly (e.g., unpowered wheels that rotate freely around a vertical pivot axis). As a further example, the rear tractive assembly 80 of the windrower 12 may include separate left and right axle members that oscillate independently on adjustable, pressurized air suspension systems. In some embodiments, the front or rear castor assembly may include connections to the steering system that allow the operator to angle, direct, or steer the unpowered wheels (e.g., an active steering system, an active rear steering system, etc.). In other embodiments, ground drive pumps and wheel motors may be coupled to one or more wheels of the windrower 12.

Figure 4:
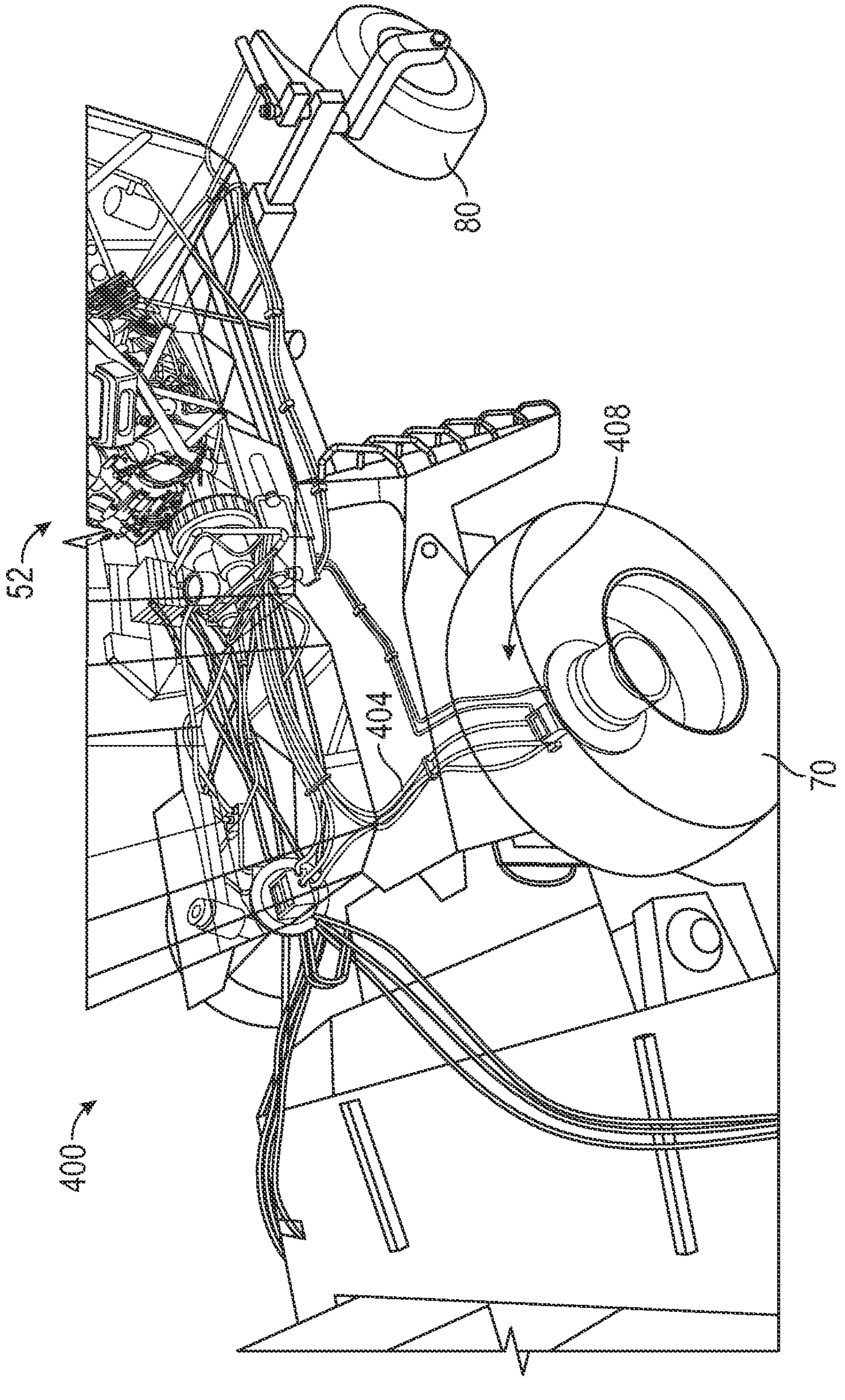

For example, the windrower 12 may include a hydrostatic steering system and/or a drive-by-wire system 400, as shown in FIG. 4. The drive-by-wire system 400 may include a ground drive pump system 404 and wheel motors 408 to actuate/create torque to turn the wheels of the front tractive assembly 70 and/or rear tractive assembly 80. In such embodiments, the steering system may use hydraulic lines/hoses connected to steering cylinders which tilt, angle, and/or adjust one or more wheels to guide the windrower 12 around curves or bends. The ground drive pump system 404 and wheel motors 408 may further provide power to and control the wheel speed of the wheels to allow the windrower 12 to maneuver in straighter mowing lines and maneuver sharply around curves and bends. In some hydrostatic and/or drive-by wire steering embodiments, components such as a steering column, intermediate shafts, pumps, hoses, belts, coolers, etc. may be removed from the windrower 12. In further embodiments, the windrower 12 may include four-wheel steering, Ackermann steering, or other suitable steering configurations. In this way, various steering and driveline system may be utilized for a windrower 12 to accurately guide and direct the windrower 12 through an agricultural area 16. As explained herein, the precise steering and control of the windrower 12 provides additional benefits to the system and method for automatic detection of pivot tracks and borders by allowing the operator to guide the windrower 12 along uniform and controlled paths that collect clear data points in consistent locations as the windrower 12 experiences header 14 "float" as it passes over a pivot track, border, etc.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the windrower 12. The trailer brakes are positioned to facilitate selectively braking one or more axles and/or one more tractive elements (e.g., wheels, etc.) of the trailed implement.

System for Auto-Detection of Pivot Tracks and Borders

Figure 5:
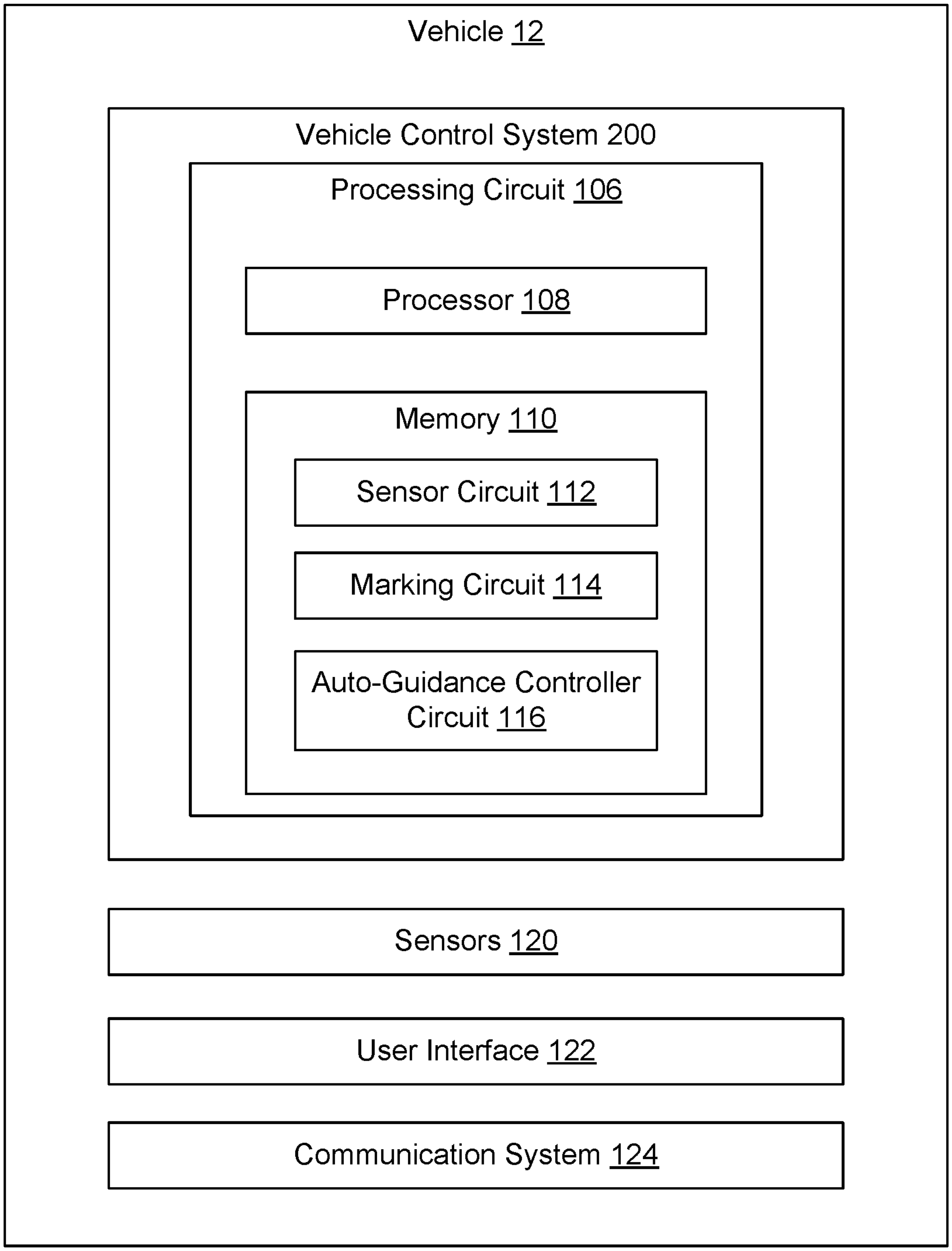
FIG. 5 is a schematic block diagram of a vehicle control system for controlling the vehicle of FIG. 1, according to an exemplary embodiment.

Referring now to FIG. 5, a schematic diagram of an agricultural windrower 12 with a vehicle control system 200 is shown according to an exemplary embodiment. The agricultural windrower 12 includes vehicle control system 200, sensor(s) 120, user interface 122, and communication system 124. The vehicle control system 200 may control operation of the agricultural windrower 12 to implement an auto-guidance vehicle control scheme. In various embodiments, the vehicle control system 200 is physically located with the agricultural windrower 12. For example, the vehicle control system 200 may be or include a hardware component installed in or on the agricultural windrower 12. Additionally or alternatively, part or all of the vehicle control system 200 may be located separately from the agricultural windrower 12. For example, in some implementations, portions of the vehicle control system 200 may be implemented within a remote processing system (e.g., a server, two or more computing systems/servers in a distributed computing implementation, a cloud-based processing system, etc.) configured to receive input from a remote data source and generate data and/or control first the agricultural windrower 12 remotely.

The sensor(s) 120 may monitor one or more parameters associated with the agricultural windrower 12. For example, the sensor(s) 120 include position sensors configured to communicate with a marking circuit 114 and/or the auto-guidance controller circuit 116 to identify the locations of pivot tracks and/or borders. In various embodiments, the sensor(s) 120 are physically located on or in the agricultural windrower 12. For example, the sensor(s) 120 may include a position sensor mounted to the hydraulic cylinders 15 of the header 14 (as shown in FIG. 1). When the header passes over a pivot track or border, the position sensor 120 detects a change in position as the header 14 "floats" over the pivot track or border. The sensor 120 then communicates to the marking circuit 114 to indicate that the marking circuit 114 should mark the location (e.g., mark the location as a point on a GPS map) as a location of a pivot track or field border. The sensors 120 may also include optical sensors mounted to the header, height sensors mounted to the header 14, windrower 12, or hydraulic cylinders 15, or other suitable sensors to detect the change in the header 14 as it passes over the pivot track or border.

Figure 6:
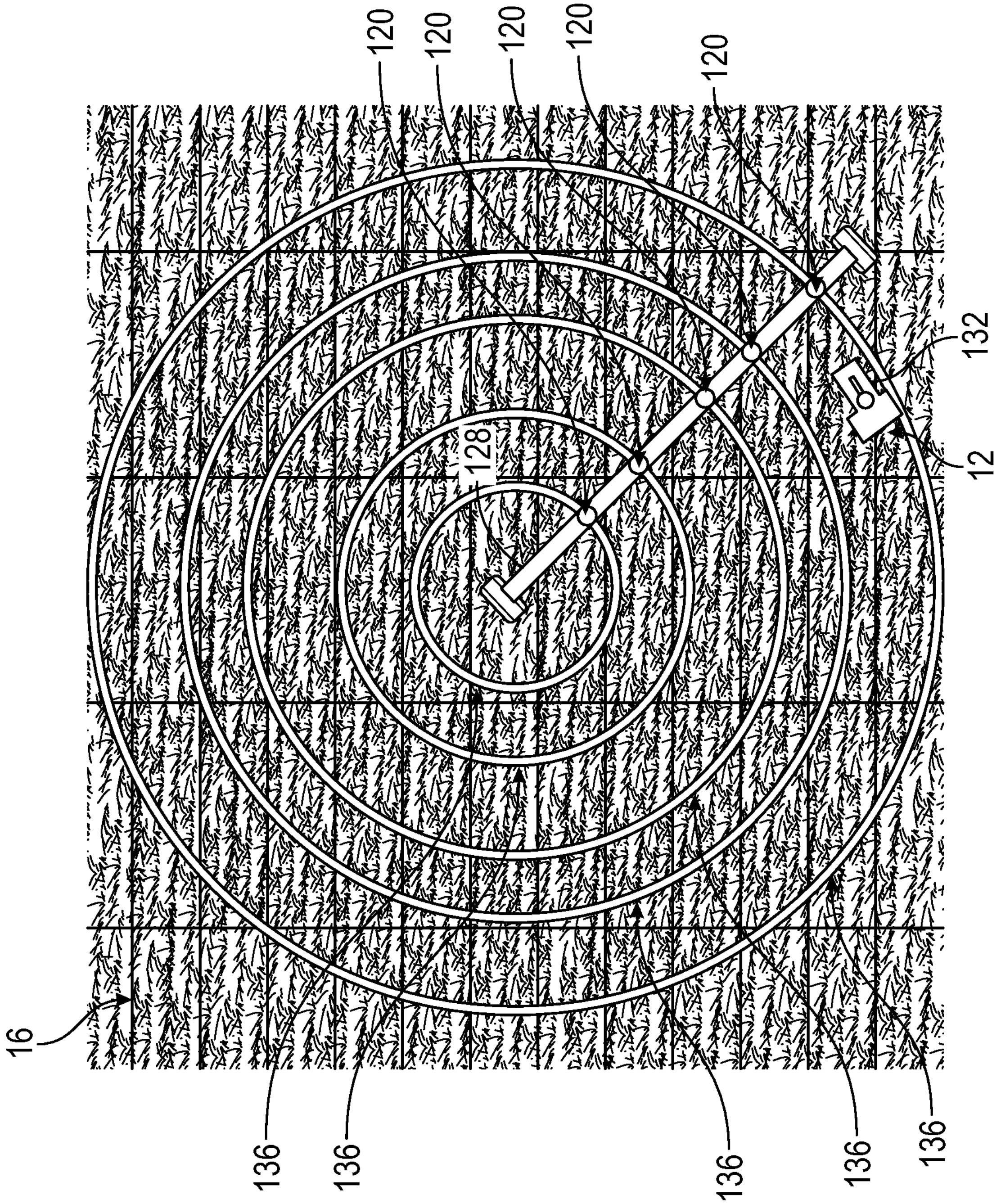
FIG. 6 is a diagram of an exemplary system for automatically detecting pivot tracks and borders, according to an exemplary embodiment.

As shown in FIG. 6, additionally or alternatively, sensor (s) 120 may be located separately from the agricultural windrower 12. In some embodiments, the sensor(s) 120 may include hardware and/or software components. For example, the sensor(s) 120 may include GPS receivers configured to receive positional data and a software component configured to determine positional parameters associated with pivot towers of an irrigation system 128. As another example, sensor(s) 120 may include an optical device (e.g., a camera, LIDAR sensor, etc.) configured to capture image data to locate pivot tracks 136 of the irrigation system. The sensors 120 (e.g., GPS receivers, etc.) of the irrigation system 128 are coupled to the pivot towers and thus denote the location of the pivot tracks 136 as the irrigation system rotates/traverses the agricultural area 16. The sensors 120 coupled to the pivot tower communicate the location of the pivot tracks 136 to the windrower 12. For example, the location of the pivot tracks 136 may be received by the vehicle control system 200 and/or a GPS unit 132 of the windrower 12, which may be a component of or communicatively coupled to the marking circuit 114, auto-guidance controller circuit 116, user interface 122, communication system 124, etc.

Referring back to FIG. 5, the user interface 122 may facilitate user interaction with the agricultural windrower 12. The user interface 122 may include elements configured to present information to a user and receive user input. For example, the user interface 122 may include a display device (e.g., a graphical display, a touchscreen, a GPS unit 132, etc.), an audio device (e.g., a speaker, etc.), manual controls (e.g., manual steering control, manual transmission control, manual braking control, etc.), and/or the like. The user interface 122 may include hardware and/or software components. For example, the user interface 122 may include a microphone configured to receive user voice input and a software component configured to control the agricultural windrower 12 based on the received user voice input. In various embodiments, the user interface 122 presents information associated with the operation of the agricultural windrower 12 to a user and facilitates user control of operating parameters. For example, the user interface 122 may display operational parameters (e.g., fuel level, seed level, penetration depth of ground engaging tools, guidance swath, etc.) on a touchscreen display and receive user control input via the touchscreen display.

The communication system 124 may facilitate communication between the agricultural windrower 12 and/or vehicle control system 200 and external systems (e.g., a remote database, the sensors 120 coupled to the irrigation system 128, etc.). The communication system 124 may be or include wired or wireless communications interfaces (e.g., jacks, antennas, transmitters, receivers, transceivers, wire terminals, etc.) for conducting data communications with other external systems or devices. In various embodiments, communications via communication system 124 is direct (e.g., local wired or wireless communications). Additionally or alternatively, communications via the communication system 124 may utilize a network (e.g., a WAN, the Internet, a cellular network, a vehicle-to-vehicle network, etc.). For example, vehicle control system 200 may communicate with a decision support system (DSS) using a 4G and/or 5G connection (e.g., via a 4G or 5G access point/small cell base station, etc.). In some embodiments, communication system 124 facilitates vehicle-to-vehicle (V2V) and/or vehicle-to-everything (V2X) communication. For example, communication system 124 may facilitate communication between multiple agricultural vehicles 10 using the IEEE 802.11p standard (e.g., a wireless access in vehicular environments (WAVE) vehicular communication system) and/or Wi-Fi.

In some embodiments, the vehicle control system 200 includes a processing circuit 106 having a processor 108 and a memory 110. In some embodiments, vehicle control system 200 includes one or more processing circuits 106 including one or more processors 108 and one or more memories 110. Each of the processors 108 can be a general purpose or specific purpose processor, an application specific integrated circuit (ASIC), one or more field programmable gate arrays (FPGAs), a group of processing components, or other suitable processing components. Each of the processors 108 is configured to execute computer code or instructions stored in the memory 110 or received from other computer readable media (e.g., CDROM, network storage, a remote server, etc.).

In some embodiments, the memory 110 may include one or more devices (e.g., memory units, memory devices, storage devices, or other computer-readable media) for storing data and/or computer code for completing and/or facilitating the various processes described in the present disclosure. The memory 110 may include random access memory (RAM), read-only memory (ROM), hard drive storage, temporary storage, non-volatile memory, flash memory, optical memory, or any other suitable memory for storing software objects and/or computer instructions. The memory 110 may include database components, object code components, script components, or any other type of information structure for supporting the various activities and information structures described in the present disclosure. The memory 110 may be communicably connected to the processor(s) 108 via the processing circuit 106 and may include computer code for executing (e.g., by processor 108) one or more of the processes described herein.

In some embodiments, the memory 110 is shown to include a sensor circuit 112, a marking circuit 114, and an auto-guidance controller circuit 116. In some embodiments, the sensor circuit 112 is configured to receive sensor information about the agricultural windrower 12 such as a change in position of the header 14 or hydraulic cylinder 15 when the windrower 12 travels over a pivot track 136 or field border. For example, the sensor circuit 112 may be coupled to a sensor 120 coupled to the hydraulic cylinder/header that is configured to detect a change in position as the header 14 floats over a pivot track 136 or field border. The sensor circuit 112 may also be communicatively coupled to sensors 120 (e.g., GPS receivers and the like) coupled to the pivot towers of the irrigation system 128.

Figure 7:
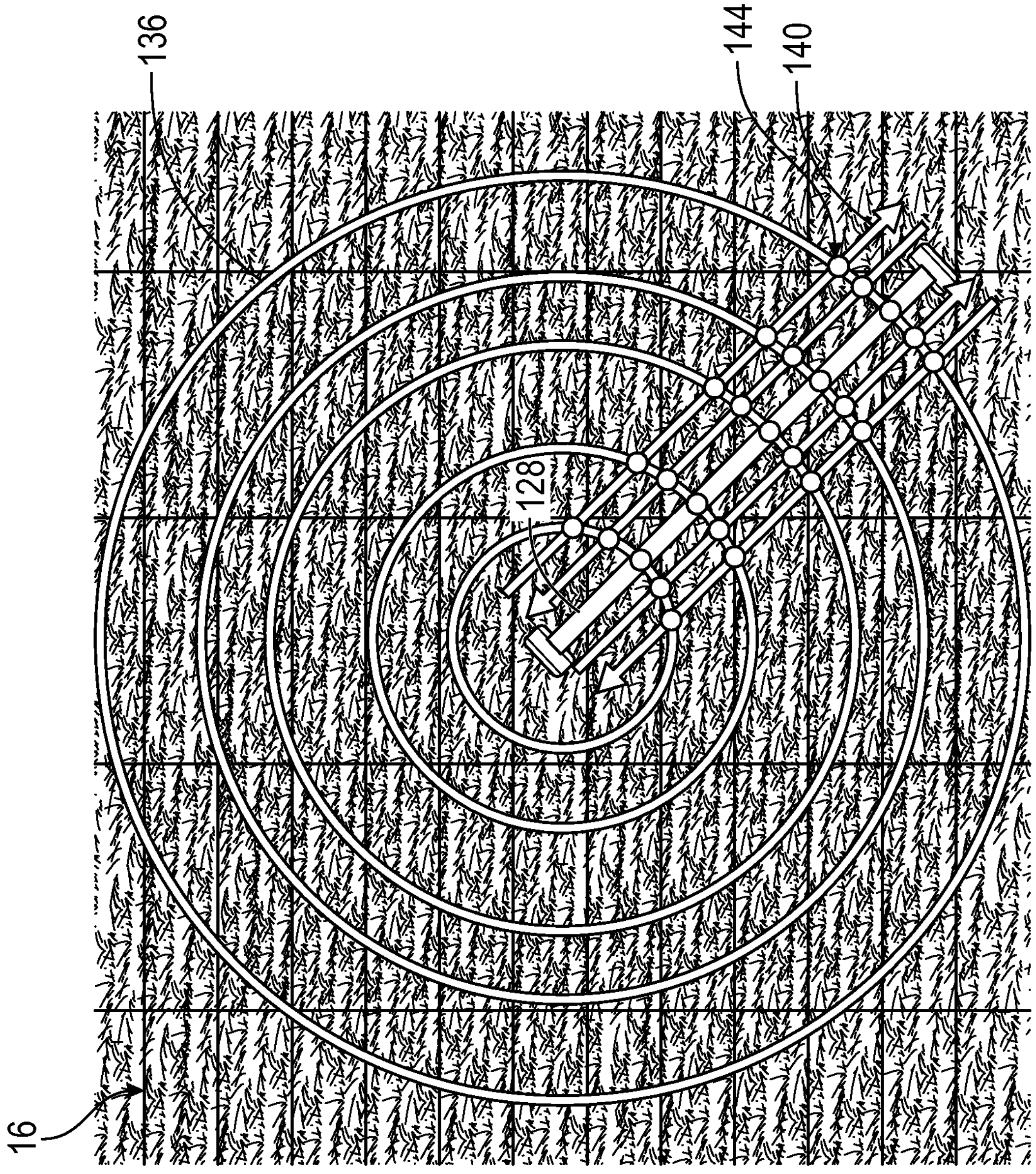
FIG. 7 is a diagram showing an exemplary data set collected by a system for automatically detecting pivot tracks and borders.

As shown in FIG. 7, in some embodiments, the marking circuit 114 is configured to receive the position information from the sensor circuit 112 and use that information to map the full length of the pivot track 136 or field border for the autoguidance system. Specifically, the marking circuit 114 is configured to mark locations of pivot tracks 136 as the windrower passes over the pivot tracks 136 (e.g., when cutting headlands around a pivot tower). As shown in FIG. 7, the windrower 12 travels in paths 140 while cutting headlands around the irrigation system 128. As the header 14 passes over the pivot tracks 136, the sensors 120 on the hydraulic cylinders 15 and/or header 14 detect a change in position corresponding to "floating" over the pivot track 136. Upon receiving the position information from the sensors 120 and/or the sensor circuit 112, the marking circuit 114 places a mark 144 (e.g., a point marker on a GPS, a coordinate marker, a longitude latitude, etc.) corresponding to the location of the pivot track 136. In alternative embodiments, the marking circuit sends an indication to mark the geographic position to other components of the vehicle control system 200. When the windrower 12 finishes cutting the headlands around the pivot tower of the irrigation system 128, multiple marks 144 are present along each path 140. The marking circuit 114 and/or the vehicle control system 200 may then map/calculate the full length of the pivot tracks 136 by calculating the curvature/path between the marks corresponding to each track and extrapolating the track onto a GPS map. The position of the pivot tracks 136 is then communicated to the autoguidance system to facilitate optimized pathing with minimal user input.

Figure 8:
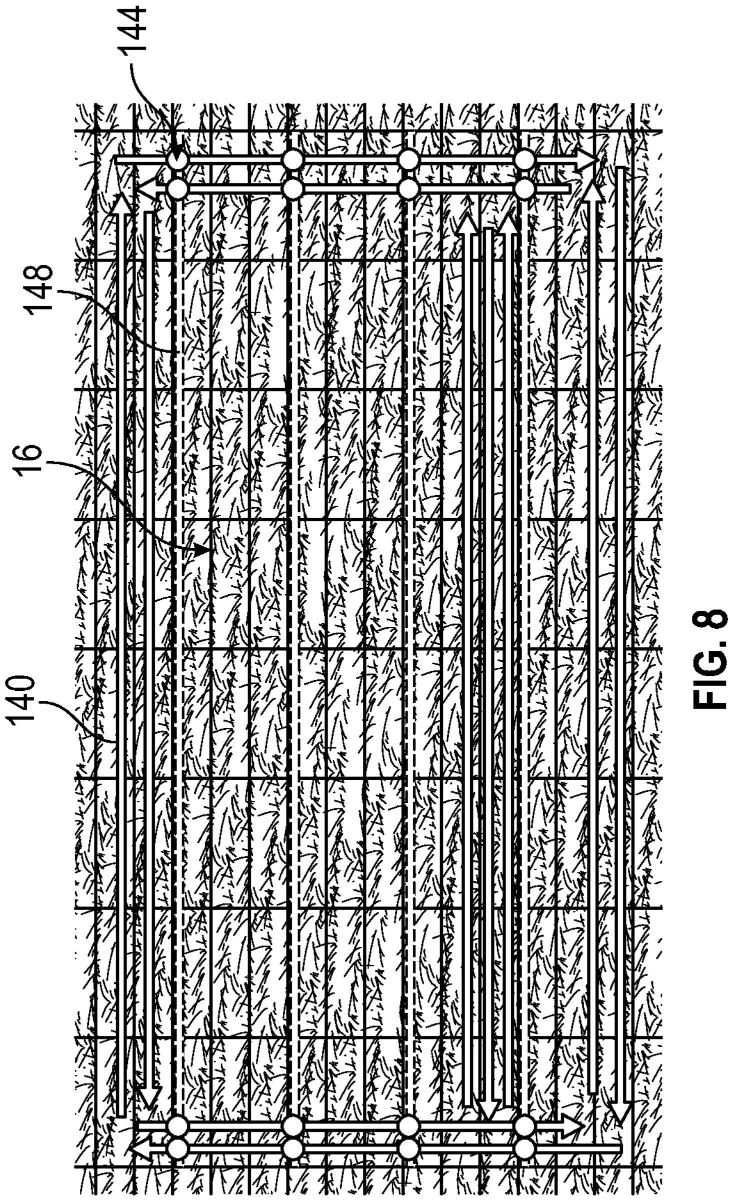
FIG. 8 is an alternative diagram showing an exemplary data set collected by a system for automatically detecting pivot tracks and borders.

As shown in FIG. 8, in some embodiments, the marking circuit 114 is configured to mark locations of checks 148 (e.g., borders) as the windrower 12 cuts headlands around the perimeter of a rectangular agricultural area 16. In such embodiments, the windrower 12 travels along paths 140 while cutting headlands around agricultural zone 16. When the header 14 of the windrower 12 crosses the checks 148 (e.g., borders), the sensors 120 coupled to the header 14 and/or hydraulic cylinders 15 detect a change in position, and communicate with the windrower 12 to note the location of a check 148. The marking circuit 114 places marks 144 (e.g., marks on a GPS map, etc.) indicative of the geographic positions of the checks 148. When the windrower 12 finishes cutting the headlands, the marking circuit 114 maps/calculates the full length of the checks 148 (e.g., borders) by calculating linking the marks via a line across the agricultural zone 16 and extrapolating the location of the checks 148 onto a GPS map. The position of the checks 148 is then communicated to the autoguidance system to facilitate optimized pathing with minimal user input.

In some embodiments, the auto-guidance controller circuit 116 may be configured to dynamically adjust the vehicle control system 200 based on the automatic detection of pivot tracks 136 and field borders received/determined by the agricultural windrower 12. The auto-guidance controller circuit 116 may facilitate autonomous guidance within the agricultural vehicle 10. Specifically, as the auto-guidance controller circuit 116 determines the presence of one or more pivot tracks 136 or field borders, the auto-guidance controller circuit 116 generates one or more mowing/raking/swathing/baling paths to optimize overlap and maintain uniform swath spacing while the windrower is in use in the agricultural zone 16.

Method for Auto-Detection of Pivot Tracks and Borders

Figure 9:
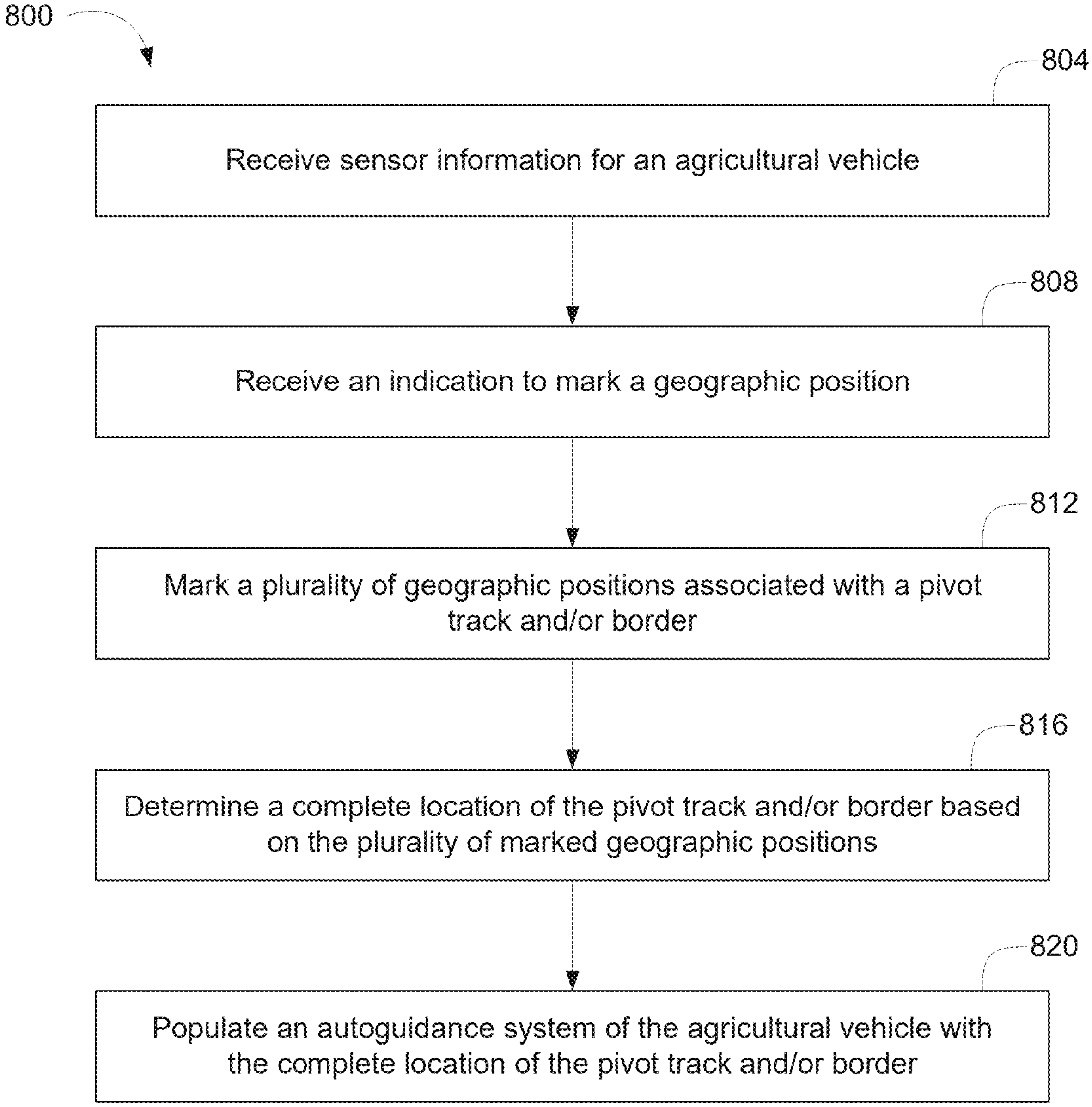
FIG. 9 is a flow chart showing exemplary steps for a method for automatically detecting pivot tracks and borders.

Referring now to FIG. 9, a method 800 for automatically detecting pivot tracks and borders by the windrower 12 based on a vehicle control system 200 utilizing an auto-guidance controller is shown, according to an exemplary embodiment. In some embodiments, the method 800 may be executed by the windrower 12. More specifically, the method 800 may be executed by the vehicle control system 200.

At step 804, the vehicle control system 200 may receive sensor information for an agricultural vehicle 10, in some embodiments. As explained above, the vehicle control system 200 includes the sensor circuit 112 which is communicably coupled to one or more sensors 120 associated with the agricultural windrower 12. The sensor circuit 112 may be structured to receive, aggregate, and store sensor information about the agricultural windrower 12. In some embodiments, the sensor information indicates a change in position of a header 14 as it passes over a pivot track 136, check 148, or border. In some embodiments, the sensor information may include data from a hydraulics sensor assembly which will provide information about how the agricultural vehicle 10 or the implement attached to the agricultural vehicle 10 is being operated (e.g., detecting a change in position of the hydraulics cylinder 15 as the windrower 12 passes over a pivot track 136 or border). For example, an agricultural vehicle 10 may pass over a pivot track 136. In such an case, the vehicle control system 200 may receive information from a sensor 120 which may allow the vehicle control system to determine that a location associated with a pivot track 136 should be marked (e.g. on a GPS map). In other embodiments, the vehicle control system may receive sensor information from sensors 120 coupled to an irrigation system 128. The sensors 120 coupled to the irrigation system 128 may be GPS receivers or the like and indicate the location of the pivot tracks 136 beneath the irrigation system 128. The sensor information described herein is only exemplary and not meant to be limiting. In some embodiments, a first sensor 120 and a second sensor 120 are coupled to the agricultural vehicle 10 (e.g., a header of the agricultural vehicle 10, a hydraulic cylinder of the agricultural vehicle 10, etc.) and a third sensor 120 is coupled to an irrigation system (e.g., a pivot tower, a support tower, a wheel, etc.), and the first sensor 120, the second sensor 120, and the third sensor 120 are configured to detect a change in position (e.g., a change in position of the header of the agricultural vehicle 10, a change in position of the hydraulic cylinder, a change in position of the pivot tower, etc.).

At step 808, the vehicle control system 200 may receive an indication to mark a geographic position. As explained above, the vehicle control system 200 includes the marking circuit 114 configured to receive the vehicle information from the sensor circuit 112 and use that information to place a mark on a GPS, log a location in a database, etc. indicative of the geographic position of a pivot track 136 and/or a border. For example, the marking circuit 114 may receive sensor information detecting a displacement of the header 14 or the hydraulic cylinder 15 as the windrower 12 travels over a pivot track 136. The marking circuit 114 may use the sensor information to indicate that the location should be marked on the GPS unit 132 of the windrower 12.

At step 812, the vehicle control system 200 marks a plurality of geographic positions associated with the locations of one or more pivot tracks 136 and/or one or more borders. Specifically, each time the sensors 120 detect a change in position and an indication to mark a geographic position is received by the windrower 12, the vehicle control system 200 marks the geographic position associated with the pivot track 136 and/or the border. The vehicle control system 200 may compare the marked geographic positions to known coordinates, headland cutting paths, etc. The vehicle control system 200 may also overlap the marked locations on a GPS map, may store the marked geographic coordinates in the memory 110, etc. The vehicle control system 200 may also be configured to designate a start time and an end time for marking a plurality of geographic positions associated with the pivot tracks 136 and/or borders. For example, the vehicle control system 200 may receive an indication (e.g., via a user input on the user interface 122) that the operator is beginning the process of cutting headlands in the agricultural zone 16. The vehicle control system 200 may designate the beginning of this process as the start time to begin marking geographic positions. Likewise, the vehicle control system 200 may receive an indication (e.g., via a user input on the user interface 122) that the operator has completed the process of cutting headlands in the agricultural zone 16. The vehicle control system 200 may designate the end of this process as the end time to conclude marking geographic positions.

At step 816, the vehicle control system 200 may determine a complete location of one or more pivot tracks 136 and/or one or more borders based on the plurality of marked geographic positions. For example, the marking circuit 114 may have designated a plurality of geographic positions associated with a pivot track 136 each time the sensors 120 passed over the pivot track 136 when cutting headlands, as shown in FIG. 7. The vehicle control system 200 may determine that the locations of the marked geographic position is indicative of a central pivot irrigation system, and may complete the full circular path of the pivot track 136 by extrapolating based on the arc of the marked geographic positions. In other embodiments, the user may designate that the vehicle control system 200 will be collecting data associated with the location of pivot tracks 136 or borders by specifying a field type via the user interface 122 before cutting headlands. In other embodiments, as shown in FIG. 8, the vehicle control system 200 may log the paths 140 taken to cut the headlands, note the marks 144 made, associate the marks 144 with a linear field, and extrapolate between the marked geographic positions to calculate the length of field borders or checks 148.

At step 820, the vehicle control system 200 may populate the auto-guidance system of the agricultural windrower 12 with the complete location of one or more pivot tracks 136 and or borders. As mentioned above, the vehicle control system 200 includes the auto-guidance controller circuit 116 which is configured to receive data from the marking circuit 114 and update the control of the windrower 12 based on the indication of geographic positions indicative of pivot tracks 136 and borders. In some embodiments, the auto-guidance controller circuit 116 updates the vehicle control system 200 by overlaying the GPS unit 132 with the automatically calculated locations of the pivot tracks 136 and/or borders. For example, as the auto-guidance controller circuit 116 receives a complete data set of marked geographic positions, the auto-guidance controller circuit 116 generates one or more boundaries on the GPS that are factored in to the automatic guidance system of the windrower. In some embodiments, the population of the complete locations of pivot tracks 136 and borders allows for the automatic guidance system to determine optimal pathing and to maintain uniform swath spacing with little user input immediately upon entering the field.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the windrower 12 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A system for automatically detecting pivot tracks comprising:

an agricultural vehicle;

a sensor coupled to the agricultural vehicle, the sensor configured to detect a change in position; and a vehicle control system comprising one or more processing circuits, each processing circuit including a processor and a memory, the memory having instructions stored thereon that, when executed by the processor, cause the processing circuit to:

receive sensor information for the agricultural vehicle from the sensor, determine that the sensor information indicates a plurality of float events at which the agricultural vehicle travels through a plurality of geographic positions associated with a pivot track, mark the plurality of geographic positions associated with the pivot track based on the sensor information indicating the plurality of float events, determine a complete location of the pivot track based on the plurality of geographic positions associated with the pivot track, at least in part by extrapolating from the plurality of geographic positions, and update an autoguidance system of the agricultural vehicle with the complete location of the pivot track, wherein the autoguidance system generates an adjusted path for the agricultural vehicle comprising a plurality of swaths that are uniformly spaced within an agricultural zone based on the complete location of the pivot track.

2. The system for automatically detecting pivot tracks of claim 1, wherein the processing circuit is further configured to:

populate the autoguidance system of the agricultural vehicle with the complete location of the pivot track.

3. The system of claim 2, wherein populating the autoguidance system of the agricultural vehicle includes displaying an image of the pivot track on a GPS unit.

4. The system for automatically detecting pivot tracks of claim 1, wherein the agricultural vehicle further comprises a header; and the sensor is coupled to the header and is configured to detect the change in position as the header travels over the pivot track.

5. The system for automatically detecting pivot tracks of claim 1, wherein the agricultural vehicle further comprises a hydraulic cylinder; and the sensor is coupled to the hydraulic cylinder and is configured to detect the change in position as the hydraulic cylinder travels over the pivot track.

6. The system for automatically detecting pivot tracks of claim 1, wherein the processing circuit is further configured to:

receive an indication of a period bounded by a start time and an end time; and wherein the processor only marks the plurality of geographic positions associated with the pivot track during the period bounded by the start time and the end time.

7. A non-transitory computer-readable storage medium (CRM) having instructions stored thereon, the instructions executable by one or more processors to receive sensor information for an agricultural vehicle from a sensor coupled to the agricultural vehicle, the sensor configured to detect a change in position, determine that the sensor information indicates a plurality of float events at which the agricultural vehicle travels through a plurality of geographic positions associated with a pivot track, mark the plurality of geographic positions associated with the pivot track based on the sensor information indicating the plurality of float events, determine a complete location of the pivot track based on the plurality of geographic positions associated with the pivot track, at least in part by extrapolating from the plurality of geographic positions, and update an autoguidance system of the agricultural vehicle with the complete location of the pivot track, wherein the autoguidance system generates an adjusted path for the agricultural vehicle comprising a plurality of swaths that are uniformly spaced within an agricultural zone based on the complete location of the pivot track.

8. The non-transitory CRM of claim 7, wherein at least one sensor is a GPS receiver communicatively coupled to the agricultural vehicle.

9. The non-transitory CRM of claim 7, wherein a plurality of sensors are coupled to an irrigation system, each of the plurality of sensors coupled to a pivot tower of the irrigation system and configured to collect data indicating a geographic position; and wherein the instructions are executable by the one or more processors to:

receive sensor information for the agricultural vehicle from each of the plurality of sensors, and determine the complete location of the pivot track associated with each of the plurality of sensors.

10. The non-transitory CRM of claim 9, wherein each of the plurality of sensors is a GPS receiver communicatively coupled to the agricultural vehicle.

11. The non-transitory CRM of claim 7, wherein the instructions are executable by the one or more processors to populate the autoguidance system of the agricultural vehicle with complete locations of a plurality of pivot tracks.

12. The non-transitory CRM of claim 9, wherein the instructions are executable by the one or more processors to populate the autoguidance system of the agricultural vehicle with the complete location of each pivot track associated with each of the plurality of sensors.

13. A method for automatically detecting pivot tracks comprising:

receiving, by one or more processors, sensor information for an agricultural vehicle from one or more sensors;

determining, by the one or more processors, that the sensor information indicates a plurality of float events at which the agricultural vehicle travels through a plurality of geographic positions associated with a pivot track;

marking, by the one or more processors, the plurality of geographic positions associated with the pivot track based on the sensor information indicating the plurality of float events; and determining, by the one or more processors, a complete location across an agricultural zone of the pivot track based on the plurality of marked geographic positions associated with the pivot track, at least in part by extrapolating from the plurality of geographic positions, updating, by the one or more processors, an autoguidance system of the agricultural vehicle with the complete location of the pivot track, wherein the autoguidance system generates an adjusted path for the agricultural vehicle comprising a plurality of swaths that are uniformly spaced within the agricultural zone based on the complete location of the pivot track, and autonomously operating, by the one or more processors, the agricultural vehicle according to the complete location across the agricultural zone.

14. The method of claim 13, wherein at least one sensor is coupled to a header of the agricultural vehicle.

15. The method of claim 13, wherein at least one sensor is coupled to a hydraulic cylinder of the agricultural vehicle.

16. The method of claim 13, further comprising:

populating the autoguidance system of the agricultural vehicle with the complete location of the pivot track.

17. The method of claim 13, wherein the method further comprises displaying the adjusted path.

18. The method of claim 13, wherein the step of marking the plurality of geographic positions occurs only during a period bounded by a start time and an end time.

19. The method of claim 18, wherein the start time corresponds to a beginning of a process of cutting headlands.

20. The method of claim 18, wherein the end time corresponds to a conclusion of a process of cutting headlands.

* * * * *